US012586037B2

(12) United States Patent
Maggiore et al.

(10) Patent No.: US 12,586,037 B2
(45) Date of Patent: Mar. 24, 2026

(54) SYSTEM AND METHOD FOR AUTONOMOUSLY GENERATING DIGITAL PROCEDURES AND PROCEDURE GUIDANCE WITHIN A FACILITY

(71) Applicant: Apprentice FS, Inc., Jersey City, NJ (US)

(72) Inventors: Frank Maggiore, Jersey City, NJ (US); Angelo Stracquatanio, Jersey City, NJ (US); Quoc Duong, Jersey City, NJ (US); Michael Keels, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 175 days.

(21) Appl. No.: 18/658,257

(22) Filed: May 8, 2024

(65) Prior Publication Data

US 2024/0412164 A1     Dec. 12, 2024

Related U.S. Application Data

(63) Continuation-in-part of application No. 18/204,837, filed on Jun. 1, 2023, now abandoned, which is a
(Continued)

(51) Int. Cl.
*G06Q 10/10*          (2023.01)
*G06F 3/01*           (2006.01)
(Continued)

(52) U.S. Cl.
CPC ............. *G06Q 10/10* (2013.01); *G06F 3/012* (2013.01); *G06Q 10/06316* (2013.01);
(Continued)

(58) Field of Classification Search
CPC .. G06Q 10/10; G06Q 10/06316; G06V 20/20; G06F 3/012; G06T 11/00; G06T 2200/24
See application file for complete search history.

(56) References Cited

U.S. PATENT DOCUMENTS

| | | | | |
|---|---|---|---|---|
| 7,496,580 B2 * | 2/2009 | Hajdukiewicz | ........ | G06Q 10/06 |
| 9,911,167 B2 * | 3/2018 | James | .................... | G16H 30/20 |

(Continued)

*Primary Examiner* — Abderrahim Merouan
(74) *Attorney, Agent, or Firm* — Run8 Patent Group, LLC; Peter Miller

(57) ABSTRACT

A method for automatically generating a digital procedure includes, during a set-up period: aggregating an equipment manual and instructional blocks associated with an equipment unit into a data container; correlating data, in the data container, with a set of language signals; and aggregating the set of language signals into a procedure authoring model characteristic of a procedure convention for performing steps of instructional blocks by an operator at the equipment unit. The method also includes, during a deployment period: receiving an authoring request; detecting the set of language signals in the authoring request; correlating text, in the authoring request, to an action signal related to the equipment unit; and based on the action signal and the procedure authoring model, generating a sequence of instructional blocks predicted to yield an outcome of the request.

1 Claim, 2 Drawing Sheets

Related U.S. Application Data continuation of application No. 17/690,944, filed on Mar. 9, 2022, now Pat. No. 11,710,100, which is a continuation of application No. 16/678,992, filed on Nov. 8, 2019, now Pat. No. 11,301,793.

(60) Provisional application No. 63/522,843, filed on Jun. 23, 2023, provisional application No. 63/522,840, filed on Jun. 23, 2023, provisional application No. 62/757,593, filed on Nov. 8, 2018.

(51) Int. Cl.

| | |
|---|---|
| *G06Q 10/0631* | (2023.01) |
| *G06T 11/00* | (2006.01) |
| *G06V 20/20* | (2022.01) |

(52) U.S. Cl.
CPC .............. *G06T 11/00* (2013.01); *G06V 20/20* (2022.01); *G06T 2200/24* (2013.01)

(56) References Cited

U.S. PATENT DOCUMENTS

| | | | | |
|---|---|---|---|---|
| 11,783,062 | B2 * | 10/2023 | Lounsberry | ......... G06F 21/6218 |
| | | | | 726/30 |
| 2022/0004369 | A1 * | 1/2022 | Thiebaut-George | ... G08B 29/18 |
| 2022/0004754 | A1 * | 1/2022 | Huang | .................. G06N 3/045 |
| 2024/0412164 | A1 * | 12/2024 | Maggiore | .............. G06F 3/012 |

* cited by examiner

SYSTEM AND METHOD FOR AUTONOMOUSLY GENERATING DIGITAL PROCEDURES AND PROCEDURE GUIDANCE WITHIN A FACILITY

This Application is a continuation-in-part of U.S. Non-Provisional application Ser. No. 18/204,837, filed on 1 Jun. 2023, which is a continuation of U.S. Non-Provisional application Ser. No. 17/690,944, filed on 9 Mar. 2022, which is a continuation of U.S. Non-Provisional application Ser. No. 16/678,992, filed on 8 Nov. 2019, which claims the benefit of U.S. Provisional Application No. 62/757,593, filed on 8 Nov. 2018, each of which is incorporated in its entirety by this reference.

This Application claims the benefit of U.S. Provisional Application No. 63/522,840, filed on 23 Jun. 2023, and 63/522,843, filed on 23 Jun. 2023, each of which is incorporated in its entirety by this reference.

TECHNICAL FIELD

Technical Field

This invention relates generally to the field of manufacturing and more specifically to a new and useful method for automatically generating steps and guidance of a digital procedure within a manufacturing facility.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
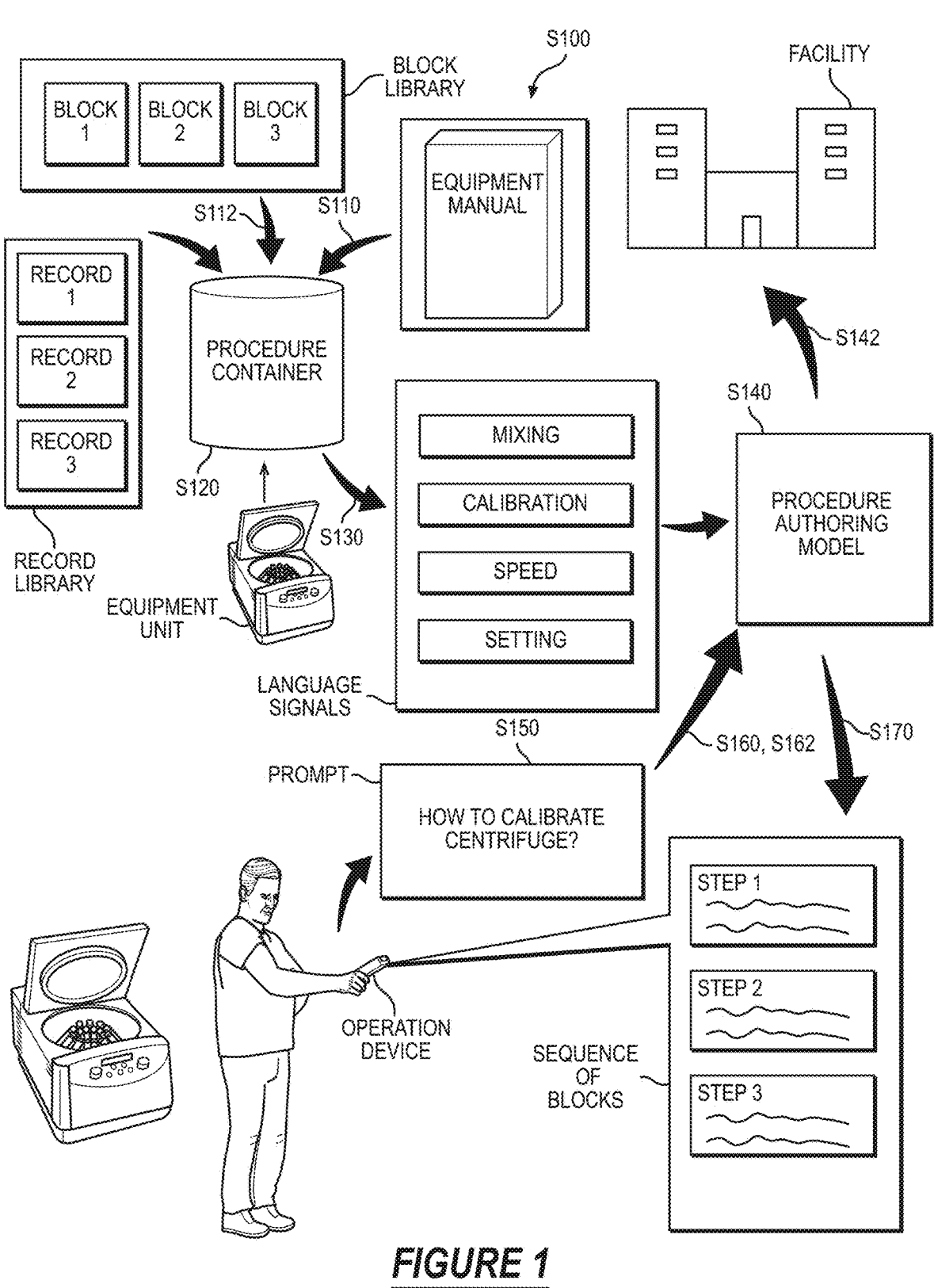
FIG. 1 is a flowchart representation of a method.
Figure 2:
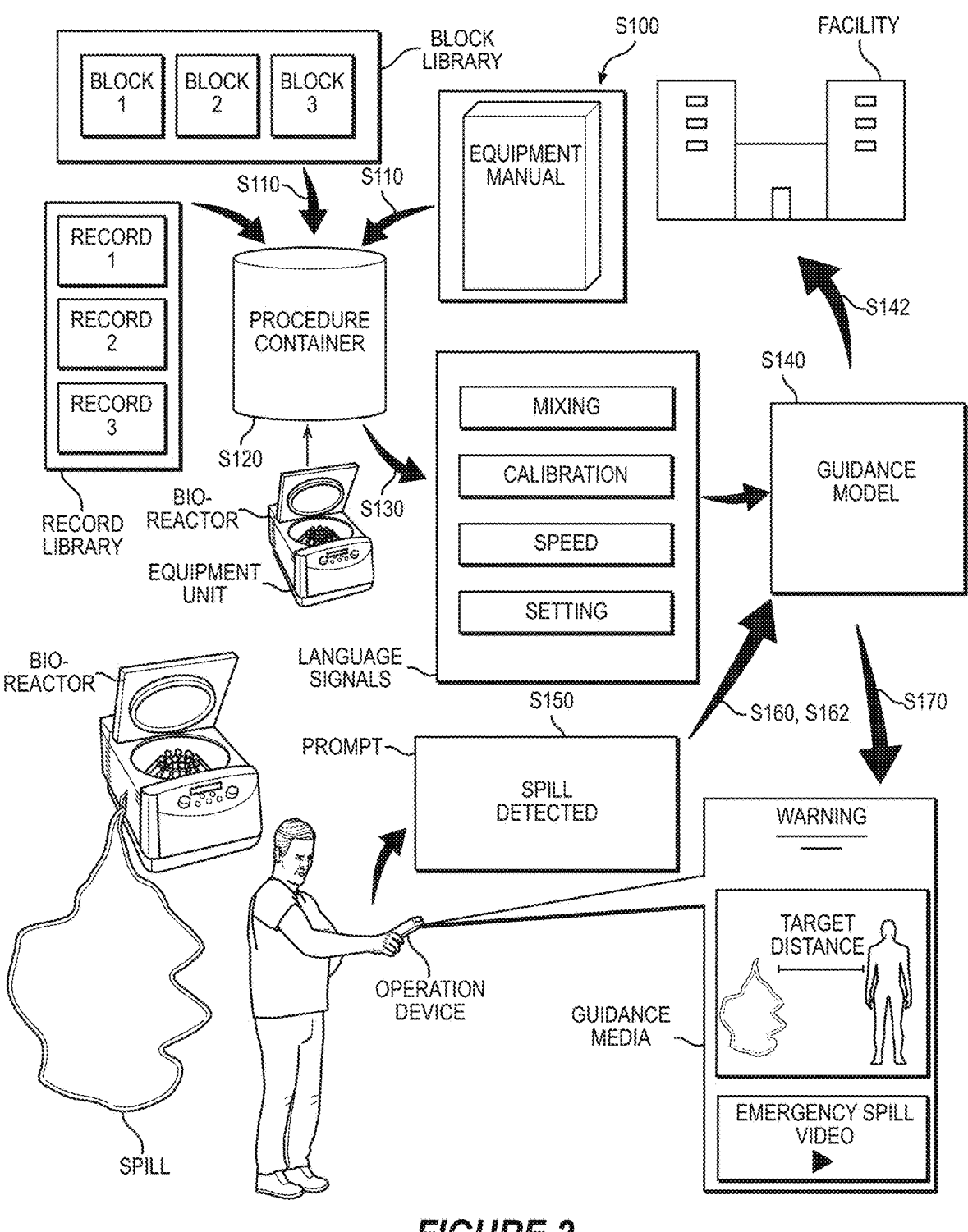
FIG. 2 is a flowchart representation of the method.

As shown in FIG. 1, a method S100 for automatically authoring digital procedures within a facility includes, during an initial time period: accessing a first equipment unit manual associated with a first equipment unit located within a particular facility in Block S110; and accessing an instructional block library containing instructional blocks for digital procedures performed at the particular facility in Block S112.

The method S100 further includes: aggregating the first equipment unit manual and a set of instructional blocks, in the instructional block library, associated with the first equipment unit into a first procedure data container in Block S120; and correlating sets of data (e.g., text, images, video), in the first procedure data container, with a first set of language signals in Block S130.

The method S100 also includes: aggregating the first set of language signals into a first procedure authoring model representing combinations of language signals, in the first set of language signals, characteristic of a first procedure convention for performing the set of instructional blocks by an operator at the first equipment unit in Block S140; and associating the first procedure authoring model to the particular facility in a corpus of facilities in Block S142.

The method S100 further includes, during a first time period following the initial time period: accessing a first procedure authoring request from an operator device associated with the particular facility in Block S150; scanning the first procedure authoring request for the first set of language signals in Block S160; and correlating a first sequence of text, in the first procedure authoring request, with a first action signal in the first set of language signals corresponding to the first equipment unit in Block S162.

The method S100 also includes, based on the first action signal and the first procedure authoring model, generating a first sequence of instructional blocks predicted to yield a first outcome (e.g., calibration, batch yield) of the first procedure authoring request within the particular facility in Block S170.

2. Terms and Definitions

Generally, "procedure authoring" as referred to herein is the modification and/or construction of instructional blocks of a digital procedure performed within a facility and/or corpus of facilities.

Generally, a "procedure convention" as referred to herein is combinations of instructions for digital procedures representative of (e.g., common to, typical of) digital procedures currently performed within a facility and/or corpus of facilities.

Generally, a "language signal" as referred to herein is a word or phrase that represents critical language concepts for performing steps of a digital procedure within a facility and/or corpus of facilities.

3. Applications

Generally, Blocks of the method S100 can be executed by a computer system to: receive a request, such as from an operator device associated with an operator within a manufacturing facility, to author a new digital procedure for a particular consumable, raw material, equipment unit or method within the facility; generate new instructional blocks of a digital procedure associated with the particular consumable, raw material, equipment unit or method within a facility based on language signals extracted from the request; and serve the new instructional blocks to the operator device, such as in a text format presented at an interactive display at the operator device, to support the operator during interaction with the particular consumable, raw material, equipment unit or method within the facility. In particular, the computer system can: initialize a procedure data container associated with the particular consumable, raw material, equipment unit or method within the facility; retrieve a consumable, raw material, equipment unit manual, directions, or method execution instructions associated with the particular consumable, raw material, equipment unit or method within the facility; retrieve a set of instructional blocks from an instructional block library associated with the particular consumable, raw material, equipment unit or method; and aggregate data (e.g., text, images, videos) extracted from the consumable, raw material, equipment unit manual, directions, or method execution instructions and the set of instructional blocks into the procedure data container.

The computer system can then: implement natural language processing techniques (e.g., natural language processing models) to correlate data in the procedure data container to a set of language signals (e.g., action signals, risk signals); and implement artificial intelligence, machine learning, regression, and/or other techniques to train a neural network to generate a sequence of instructional blocks associated with a particular consumable, raw material, equipment unit or method within the facility based on the set of language signals. Furthermore, the computer system can then: store this neural network as a procedure authoring model associated with the particular consumable, raw material, equipment unit or method and generate sequences of instructional blocks based on a procedure authoring request retrieved by the computer system.

In one example, the computer system can: implement natural language processing models to detect calibration action signals in the procedure data container associated with the particular consumable, raw material, equipment unit or method; extract text, images, audio, videos, 3D content, and other content types in the procedure data container corresponding to the calibration action signal; and train the procedure authoring model according to the text, images, audio, 3D content, and/or videos related to the calibration action signal to generate new sequences of instructional blocks for performing a calibration action at the particular consumable, raw material, equipment unit or method. Accordingly, the computer system can then: retrieve a procedure authoring request, such as from an operator device associated with an operator proximal the particular consumable, raw material, equipment unit or method; scan the procedure authoring request for the set of language signals; and detect the calibration action signal in the procedure authoring request. The computer system can then generate a new sequence of instructional blocks for implementation within the manufacturing facility based on the calibration action signal and the trained procedure authoring model.

Therefore, the computer system can: interface with an operator device to receive procedure authoring requests for a corpus of consumables, raw materials, equipment units or methods within a manufacturing facility; and generate (or "author") sequences of instructional blocks ready (or "primed") for integration within the manufacturing facility based on the procedure authoring requests and a set of procedure authoring models associated with the manufacturing facility.

3.1 Applications: Generating Guidance

In one variation, Blocks of the method S100 can be executed by a computer system to: receive a request, such as from an operator device associated with an operator within a manufacturing facility, to generate guidance media (e.g., text, images, audio, video, 3D content, AR vision) for a particular consumable, raw material, equipment unit or method within the facility; generate new guidance media according to an exposure to risk (e.g., spill risk, explosion risk, flame risk, hazardous risk) associated with the particular consumable, raw material, equipment unit or method; and serve the guidance media to the operator device, such as in a text format presented at an interactive display at the operator device, to support the operator in mitigating exposure to a risk event during performance of digital procedures within the facility proximal the particular consumable, raw material, equipment unit or method. In particular, the computer system can: initialize a procedure data container associated with the particular consumable, raw material, equipment unit or method within the facility; retrieve an consumable, raw material, equipment unit manual or method execution instructions associated with the particular consumable, raw material, equipment unit or method within the facility; retrieve a set of instructional blocks from an instructional block library associated with the particular consumable, raw material, equipment unit or method; and aggregate data (e.g., text, images, audio, videos, 3D content) extracted from the consumable, raw material, equipment unit manual or method execution instructions and the set of instructional blocks into the procedure data container. The computer system can then: correlate data in the procedure data container to a suite of risk events associated with the particular consumable, raw material, equipment unit or method; and train a neural network to autonomously generate media content (e.g., text, images, audio, videos, 3D content) based on the data in the procedure data container linked to the suite of risk events.

The suite of risk events captured and prevented by the system can be represented by multiple types of risk scenarios. This applies particularly to the case of pharmaceutical manufacturing but can also apply to general or advanced manufacturing as well. In this embodiment the primary events the system protects against are the risk to the operator(s) to protect their health and safety. In this embodiment the secondary events the system protects against are the risk to the end user who will use the product or in the case of pharmaceutical drug manufacturing receive the drug product manufactured where the patient's health or a large population of patient's health is at risk. In this embodiment the tertiary events the system protects against are the risk to the of loss of product, equipment, or damage to the facility. The risk analysis needs to prioritize the health of the operator or operators as that is the immediate health and safety risk that can be managed and assisted by the system. The health and safety of the potential consumers from an adulterated or compromised product, such as a drug product, particularly with the potential of severely affecting the outcome of a specific individual in the case of personalized medicine, such as an individualized cancer therapy, or by affecting a large population of patients, is also important for mitigating risk events, but unlike an immediate threat to the health and safety of an operator there are numerous quality checkpoints, release testing, release paperwork reviews, and time to verify the quality of the product prior to it being released. The tertiary risk to the product, the equipment, and the facility is more economic in its scope and has an impact on the company itself. There are instances where a specific lot of products being discarded or a facility going offline for a short or long period of time could impact the well-being of a patient population without redundancies of supply being in place.

Alternate or additional risk scenarios for the generation of procedure authoring and generated procedure guidance based on risk and risk scoring which may be included, but are not limited to Regulatory risks where the operator may need to comply with different and potentially contrary regulatory requirements for manufacturing products for different global regions, Cybersecurity risks which informs the operator to prevent them performing actions which increase the risk of compromising critical systems and infrastructure, Environmental risk which may particularly be important in the case of chemical or biohazardous material spills but could also be important in the proper disposal of items used in processing, Supply chain risks where the consumption of critical materials may result in delays or disruptions in the production process for a single process or potentially multiple processes across facilities, and Legal risk where failure to comply results in potential fines, legal actions, or other negative consequences.

The risk scoring process can be achieved by the computer system by using a risk assessment methodology that involves a risk matrix which identifies potential hazards that could pose a risk to the process. Once the hazards have been identified, by the operator or by the computer system, the next step is to determine the likelihood of occurrence. This can be done by analyzing historical data of previous incidents reported, conducting experiments, or using risk engine for probability an incident will occur. The next step is to determine the potential severity of the consequences if the hazard were to occur. This can be done by analyzing the potential impact on the operators, end-users (patient or patient population), and the process. Once the likelihood of occurrence and severity of consequences have been determined, the risk can be calculated within the risk matrix. This will give a risk score that can be used to prioritize the hazards and determine which ones require immediate attention. The computer system can generate the procedure steps for risk mitigation using strategies to reduce the risk to an acceptable level. This can involve implementing engineering controls, administrative controls, or personal protective equipment. Overall, scoring the risk to the process requires a thorough understanding of the hazards, likelihood of occurrence, and severity of consequences. By following a risk assessment methodology, it is possible to identify and prioritize the hazards and develop effective risk mitigation strategies to ensure a safe and efficient process.

Thus, the computer system can: detect a risk event during performance of a digital procedure by an operator at a particular consumable, raw material, equipment unit or method; and based on the guidance model and the risk event, generate guidance media (e.g., text, images, audio, video, 3D content) to support the operator in mitigating exposure to the risk event detected at the particular consumable, raw material, equipment unit or method.

4. New Procedure Generation

In one implementation of the method S100, a computer system (e.g., remote computer system) can generate the digital procedure based on a document (e.g., electronic document, paper document) outlining steps for a procedure carried out in the facility and then serve the digital procedure to the autonomous cart. In this variation, the computer system can generally: access a document (e.g., electronic document, paper document) for a procedure in the facility; and identify a sequence of steps specified in the document.

In the foregoing variation, each step in the sequence of steps specified in the document can be labeled with: a particular location within the facility associated with an operator performing the step of the procedure; a target offset distance between the autonomous cart and the operator proximal the particular location of the facility; and a supply trigger defining materials-such as consumables, raw materials, lab equipment, production equipment, devices (e.g., AR glasses, VR headsets, tablets, network devices)—configured to support the operator performing the step at the particular location. Additionally, each step in the sequence of steps can be labeled with: a risk factor corresponding to a degree of risk associated with performance of the step-by the operator—at the particular location; and an event trigger corresponding to instructions executed by the autonomous cart in response to interpreting deviations from the step-performed by the operator-specified in the document and/or in response to an emergency event.

In this implementation, the remote computer system can then, for each step in the sequence of steps: extract an instruction containing the particular location, the target offset distance, the supply trigger, the risk factor, and the event trigger for the step specified in the document; initialize a block, in a set of blocks, for the step; and populate the block with the instruction for the step. Furthermore, the computer system can: compile the set of blocks into the digital procedure according to an order of the sequence of steps defined in the document; and serve the digital procedure to the autonomous cart for execution of the method S100, in the facility, to support an operator during performance of the sequence of steps specified in the document.

5.0 Instructional Block Library

Blocks of the Method S100 recite, accessing an instructional block library containing instructional blocks for digital procedures performed at the particular facility in Block S112. In one implementation, the computer system can: access a geospatial location of the mobile device; identify a facility containing the geospatial location of the mobile device; automatically retrieve the instructional block library, such as from a remote computer system; and load the instructional block library at the mobile device for presentation to the operator. Furthermore, during performance of a modifiable digital procedure, the computer system can then automatically and/or selectively: replace instructional blocks in a current instance of the digital procedure with instructional blocks from the instructional block library; and/or add instructional blocks retrieved from the instructional block library to the current instance of the digital procedure.

For example, the mobile device can: retrieve a modifiable digital procedure containing a particular set of instructional blocks; retrieve the instructional block library containing sets of approved instructional blocks performed within the facility including the particular set of instructional blocks for the modifiable digital procedure; and present the modifiable digital procedure and these sets of instructional blocks to the operator, such as via a digital display at the mobile device associated with the operator during performance of the modifiable digital procedure. In this example, the computer system can: in response to initializing a first instructional block in the modifiable digital procedure, present a list of alternative instructional blocks for the first instructional block defined in the instructional block library to the operator; and receive confirmation of selection-by the operator at the mobile device—for an alternative instructional block from the list of alternative instructional blocks presented to the operator. The computer system can then: modify the current instance of the modifiable digital procedure to replace the first instructional block with the alternative instructional block selected by the operator; and record this modification in a procedure log for this modifiable digital procedure.

In another example, the computer system can: retrieve a modifiable digital procedure containing a particular set of instructional blocks; receive a selection-by the operator at the mobile device—to remove one or more instructional blocks in the particular set of instructional blocks for the modifiable digital procedure; and present this modified digital procedure to the operator at the mobile device. Additionally, the computer system can: retrieve the instructional block library containing sets of approved instructional blocks performed within the facility; and present the instructional block library to the operator at the mobile device. The computer system can then: receive selection of one or more instructional blocks from the instructional block library by the operator at the mobile device; and load these instructional blocks from the instructional block library to the current instance of the digital procedure. Furthermore, the computer system can: modify an order of these instructional blocks in the modified digital procedure upon selection from the operator; and generate a new digital procedure containing instructional blocks from the retrieved digital procedure and instructional blocks retrieved from the instructional block library; and transmit this new digital procedure to a supervisor for approval and/or review. Depending on the level of approval required and the requirement for the change to the procedure this supervisor review and approval can be immediate, as soon as the change is reviewed and signed off on with an electronic signature in the computer system or it may require multiple rounds of review and approvals by different supervisors within a company. To assist in the review process the changes may be highlighted in the digital procedure with the origin of where the changes are originating from, if the changes originated from a human author, if the changes came from additions were inserted by the computer system from the step library and if those changes were previously approved, if the changes came from the computer system to modify the order of the steps or insert new parameters to a template, or if the changes/modifications came from a generative AI program.

Therefore, the computer system can: modify a current instance of the digital procedure with instructional blocks from the instructional block library; generate a new digital procedure based on instructional blocks within the current instance of the digital procedure and approved instructional blocks retrieved from the instructional block library; and thereby expediting the approval process of this new digital procedure by implementing these facility approved instructional blocks from the instructional block library.

The computer system can preferentially attempt to select existing or modify existing instructional blocks from an instructional block library prior to generating a new digital procedure. This can include utilizing procedures in an instructional block library that have already been approved in the system by the Quality group at a company. If the digital procedure does not match the instructions the operator or end user requires the computer system may utilize the existing content in the approved digital procedure as a template to modify the parameters to fit the required digital procedure instructions. This can include utilizing procedures from other facilities in the company's network that are linked to the system in a connected manufacturing network, where an approved digital procedure from another site can be utilized as a template and modified by the computer system to provide the proper instructions and parameters at the facility the work will be performed. In other instances, approved sections or even individualized tasks from approved instructional blocks may be utilized to increase the likelihood that the newly generated digital procedure is accepted by the reviewers and approved by the Quality group by providing existing content from instructional blocks which has already been approved.

In the case of equipment procedures, the computer system can utilize instructional blocks from existing approved procedures for similar or related equipment and utilize those as templates for adding new instructions and parameters for a new piece of equipment being introduced into a facility or process. This can include searching and scanning an equipment manual for that new equipment and inputting it into a templated procedure to update the parameters, specifications, and steps to perform the actions with the new equipment following the digital guidance from the instructional blocks. In other instances, for new equipment that doesn't have existing procedures or no similar analog a new digital guidance procedure may be generated by the computer system using the operational specifications and instructions from the equipment manual. This can also be the case for consumables and raw materials which come with instructional guides or datasheets that contain parameters and specifications for usage and testing, such as for a consumable product like a sterilizing grade filter which would include flow rate information, pressure specifications, temperature limits, and integrity testing parameters such as bubble point and diffusion specifications for testing the filter.

In the instances of transferring methods or adopting new methods for processing the computer system can utilize other similar methods performed with the approved techniques to execute the task. The computer system may utilize methods from approved digital procedures at the facility, approved digital procedures at other facilities within the connected manufacturing network, approved sections or instructional blocks, or generate instructions from methods searched within a database, such as a cloud-based data storage system, or from the AI generation of digital content instructions and instructional blocks using trained models on existing datasets of procedures.

5.1 Generating Instructional Block Library

In one implementation, the computer system can: aggregate approved instructional blocks from each digital procedure performed at the facility; compile these instructional blocks from these digital procedures into an instructional block library; and store the instructional block library, such as at the remote computer system, for retrieval by devices within the facility. In particular, the computer system can: access an electronic document for a procedure in a facility; identify a sequence of steps specified in the electronic document; extract an instruction for each step in the sequence of steps; initialize an instructional block, in a set of instructional blocks for this step; and populate the instructional block with the instruction. The computer system can then: repeat this process for multiple electronic documents corresponding to multiple procedures at the facility; and store these sets of instructional blocks in the instructional block library contained at a remote computer system.

In another implementation, the computer system can: retrieve a particular instructional block from the instructional block library; modify text, media, values, etc. in this particular instructional block; generate a new instructional block based on this modified instructional block; and store this new instructional block in the instructional block library.

In one example of this implementation, the mobile device can: retrieve the instructional block library from a remote computer system; present the instructional block library to the operator at the mobile device; and confirm selection of a particular instructional block-by the operator—in the instructional block library presented to the operator. The computer system can then: load a modifiable instance of this particular instructional block at the mobile device of the operator; modify instructions, such as in the form of text, audio media, and visual media populated in the particular instructional block; record these modifications in a block procedure log for the particular instructional block; and generate a new instructional block based on this modified instructional block. Therefore, the computer system can generate new instructional blocks based on previously approved instructional blocks for digital procedures performed within the facility and thereby expedite review and approval process of this new instructional blocks.

In yet another implementation, the computer system can: at the mobile device of the operator, initialize a new instructional block; and generate a prompt for an operator to populate the new instructional block with an instruction. The computer system can then: serve this prompt at the mobile device of the operator; receive the instruction at the mobile device from the operator; and store this new populated instructional block at the instructional block library. For example, the computer system can: receive visual media for an instruction recorded by the operator via an optical sensor at the mobile device; receive a string of text from the operator representing the instruction via a computing interface at the mobile device; and/or receive audio media of the instruction recorded by the operator via a microphone at the mobile device. Additionally, the computer system can then populate the new instructional block with the text strings, audio media, and/or visual media received from the operator. Furthermore, the computer system can: confirm population of the new instructional block with the instruction from the operator; transmit this new instructional block to a supervisor device associated with a supervisor; and queue the new instructional block for approval and review by the supervisor.

A particular instructional block in the instructional block library can include data associated with the particular instructional block for the computer system to link the blocks to a step and/or series of steps contained within a modifiable digital procedure. For example, the particular instructional block can include labels or tags associated with this particular instructional block so an association can be made between the instructions that the particular instructional block provides, procedures currently linked to the particular instructional block, and what types of procedures and steps can be associated with the particular instructional block. Labeling of the instructional blocks allows for instructional blocks to be associated with related procedures, common procedures, equipment linked procedures, method linked procedures, or other procedure types. Instructional blocks can be uploaded from an external organization and receive labeling and/or tags when they are uploaded into the platform for association of client linked procedures for a contract manufacturing organization, where those instructional blocks are only linked to a specific client's procedures or an equipment vendor's instructional blocks where they are only linked to procedures involving that specific model of the vendor's equipment.

Additionally or alternatively, an instructional block in the block library may undergo scoring where each block receives a score for the quality of the instruction and the applicability to the procedures that they are currently linked to. In one example, an instructional block is scored by the clarity of the content, such as the clarity of the text, the audio quality of an audio clip (e.g., no static or distracting background noises), the video quality of the pixels, screen sizing, angle, and the clarity of the instructional material being shown. The quality scoring may include the conciseness of the material in the instructional block where the same level of instructional material is conveyed in a faster way compared to taking a significantly longer period of time to convey the same information. The quality of the scoring may contain the accuracy of the material where the instructional block may contain inaccurate information or outdated methods which would make it ineligible for linking to existing or new procedures. The scoring for the applicability to the procedures may include the relevance of the label and/or tags to the contents of the instructional block, the number of procedures and the types of procedures the instructional block is already linked to, and the operator voting over where they can upvote or downvote an instructional block for the quality of the content in the instructional block and the strength of the applicability to the procedures it is currently linked to. This scoring of the instructional blocks can be manually added by users and/or procedurally generated through an automated analysis algorithm.

6. Equipment Unit Manuals

Blocks of the method S100 recite, accessing a first equipment unit manual associated with a first equipment unit located within a particular facility in Block S110. Generally, the computer system can: access a set of equipment unit identifiers (e.g., make and model number) corresponding to a corpus of equipment units located within a particular facility and/or corpus of facilities; and retrieve an equipment unit manual (e.g., instruction manual, regulation manual) for each equipment unit identifier, in the set of equipment unit identifiers; and store the equipment unit manual into an equipment unit manual library, such as at a remote database and/or locally within the computer system.

In one implementation, the computer system can: retrieve the equipment unit manual for a particular equipment unit in the facility from an external computer system (e.g., manual document database); implement computer vision techniques to scan the equipment unit manual to detect words, phrases, images in the equipment unit manual; identify an equipment unit identifier in the words, phrases, and images in the equipment unit manual analogous to a particular equipment unit in a corpus of equipment units deployed in the particular facility; and link the equipment unit manual to the particular equipment unit within the facility in an equipment unit manual library. Additionally or alternatively, the computer system can: scan a physical document (e.g., paper document) representing the equipment unit manual for the particular equipment unit; and store this digital document as the equipment unit manual in the manual database.

In particular, the equipment unit manual can represent: a detailed suite of instructions corresponding to instructions and/or methods of operation (e.g., calibration instructions, troubleshooting instructions, modifying parameter settings) for a particular equipment unit associated with a digital procedure; and/or a suite of regulations (e.g., safety instructions, government regulations) associated with preferred handling of the equipment unit during performance of digital procedures within the facility.

Thus, the computer system can: compile a suite of equipment unit manuals corresponding to a corpus of equipment units currently located within a particular facility; and generate an equipment unit library based on the suite of equipment unit manuals linked to the particular facility. The computer system can additionally compile a suite of consumables, raw materials, and other materials from the corpus of available documentation, content, and digital guidance instructions for items located in a facility. This also applies to methods and the techniques for performing those methods in the execution of procedures, steps, and tasks within a facility.

7. Data Aggregation

Blocks of the method S100 recite: aggregating the first equipment unit manual and a set of instructional blocks, in the instructional block library, associated with the first equipment unit into a first procedure data container in Block S120. Generally, the computer system can: retrieve an equipment unit manual for a particular equipment unit within the facility; identify a set of instructional blocks, in the instructional block library, associated with (or "implementing") a particular equipment unit within the facility; implement text recognition and/or computer visions techniques to extract sets of data (e.g., words, phrases, images, video) from the set of instructional blocks and the equipment unit manual; and aggregate the sets of data extracted from the set of instructional blocks and the equipment unit manual into a procedure data container corresponding to the particular equipment unit within the facility.

In one implementation, the computer system can: initialize an equipment unit tag, in a set of equipment unit tags, representing a corpus of equipment units within the particular facility; populate the equipment unit tag with an equipment unit type (e.g., make and model), location within the particular facility, and calibration status of the equipment unit; and assign the equipment unit tag to the particular equipment unit at the particular facility. In this implementation, the computer system can then: query the instructional block library for a set of instructional blocks containing the equipment unit tag associated with the particular equipment unit; and aggregate the set of instructional blocks into a procedure data container corresponding to the particular equipment unit.

Furthermore, the computer system can scan the set of instructional blocks associated with the particular equipment unit and identify: sequences of texts representing steps of a procedure performed by an operator at the particular equipment unit; and images and/or video associated with the particular equipment unit. The computer system can then compile sets of data, in the procedure data container, corresponding to the sequences of texts, images, audio, and/or videos extracted from the set of instructional blocks and related to the application equipment unit.

In one example, the computer system can retrieve an equipment unit tag corresponding to a particular equipment unit within the facility analogous to a centrifuge machine located at a particular location in the facility. The computer system can then query the instructional block library for a set of instructional blocks related to and/or containing the equipment unit tag for the centrifuge machine. The instructional blocks, in the set of instructional blocks, can include: steps of a procedure related to and/or implementing the centrifuge machine within the facility; and a set of media, such as images and/or videos related to performing steps defined in the set of instructional blocks. In this example, the computer system can also: retrieve a centrifuge machine manual from the equipment unit manual library that corresponds to the centrifuge machine within the facility; and implement text recognition and/or computer vision techniques to the centrifuge machine manual to identify objects in the equipment unit manual. In particular, the computer system can: identify words and/or phrases associated with operation of the centrifuge machine; and identify reference images relevant to operation of the centrifuge machine within the facility in the equipment unit manual.

Therefore, the computer system can: aggregate data extracted from the set of instructional blocks-related to the particular equipment unit—in the procedure data container; aggregate data extracted from the equipment unit manual into the procedure data container; and subsequently train the procedure authoring model, as described below, to author (i.e., generate and/or modify) a new set of instructional blocks related to the particular equipment unit. Additionally or alternatively, the computer system can: access a procedure record library corresponding to previously performed digital procedures within the facility; scan the procedure record library to identify a set of procedure records associated with the particular equipment unit, as described above; and store the set of procedure records in the procedure data container.

7.1 Audio+Visual Data Aggregation

Additionally or alternatively, the computer system can: implement computer vision techniques, such as those described in U.S. patent application Ser. No. 17/968,677, filed on 18 Oct. 2022, which is hereby incorporated entirely by this reference, to detect objects in a sequence of images (e.g., images, video) in a set of procedure records associated with the particular equipment unit; and store the objects in the procedure data container associated with the particular equipment unit. Furthermore, the computer system can also: implement audio recognition techniques, such as those described in U.S. patent application Ser. No. 17/968,677, to detect audio phrases in the set of data related to the set of language signals in the set of procedure records; and store the audio phrases in the procedure data container associated with the particular equipment unit.

8. Generating Procedure Authoring Model

Blocks of the method S100 recite: correlating sets of data (e.g., text, images, video), in the first procedure data container, with a first set of language signals in Block S130; aggregating the first set of language signals into a first procedure authoring model representing combinations of language signals, in the first set of language signals, characteristic of a first procedure convention for performing the set of instructional blocks by an operator at the first equipment unit in Block S140; and associating the first procedure authoring model to the particular facility in a corpus of facilities in Block S142.

Generally, the computer system can: link sets of data in the procedure data container to a set of language signals representing language concepts corresponding to a procedure convention for a particular equipment unit within the facility; and train a model to generate a new sequence of instructional blocks associated with the particular equipment unit based on the set of language signals and existing digital procedures (e.g., approved digital procedures) currently performed in the facility. The trained model can consist of a larger database of all procedures existing in the system, a smaller subset of all of the Good Manufacturing Process (GMP) approved procedures, a further smaller subset of GMP approved procedures by the company itself looking to generate procedures with their layout, style, and contents, and a further even smaller subset of GMP approved procedures by the company site itself taking into account the facility layout, design, and equipment to generate procedures with the required information already included from other template procedures developed at the same site. The procedure author can utilize the user interface within the computer system to switch between the different databases of procedures to yield the best results for what they are looking for in case some databases are too small, narrow, or limited in content to provide the desired results. Thus, the computer system can train a procedure authoring model to generate new sequences of instructional blocks that: are compatible (i.e., readily integrable) within the particular facility; and predicted to achieve a target outcome (e.g., calibration, batch yield) when performed by an operator within the facility at the particular equipment unit. Any content generated from the procedure authoring model can undergo multiple reviews in the review process which provides an opportunity to correct any mistakes potentially created from the AI generated procedure content generation of new instructional blocks and the various procedure authoring models.

Additionally the procedure authoring models can translate the procedures between different language types, taking into account differences in how words and sentences are structured. This will allow the procedure authoring models to include multi-lingual content or to generate content in a single language and then auto-translate the content into the language required to be executed by the site and/or by the operator. In the computer system the procedure authoring model creates an instructional block with a language layer, where the content may be translated into each supported language within the platform.

8.1 Language Signals

The computer system can: implement language models-such as natural language processing models or natural language understanding models tuned to particular language concepts—to detect words or phrases that represent critical language concepts in the procedure data container associated with a particular equipment unit. Additionally or alternatively, the computer system can implement natural language processing techniques to detect syntax (grammar, punctuation, spelling, formatting, sequence) characteristic for words or phrases in the procedure data container for the particular equipment unit.

8.1.1 Action Signals

In one implementation, the computer system can: scan the set of instructional blocks and the equipment unit manual stored in the procedure data container; and implement an action signal model to detect words or phrases—in the set of instructional blocks and/or the equipment unit manual—related to actions and/or instructions associated with performance of digital procedures with the particular equipment unit. For example, the computer system can detect words or phrases in the set of instructional blocks and the equipment unit manual, such as: "mixing a first material and a second material"; or "calibrate the centrifuge to a target parameter".

Accordingly, the computer system can generate an action signal that represents the types and/or frequency of such action-related words or phrases in the procedure data container associated with the particular equipment unit. For example, for each word or phrase detected in the procedure data container, the computer system can: normalize the word or phrase; and generate a first action signal containing the normalized language value. In this example, the computer system can: normalize "turn on the centrifuge", "initiate the centrifuge", "start the equipment unit" to "trigger centrifuge"; and store the normalized values in discrete action signals for the procedure data container.

In another example, the computer system generates a single action signal representing presence and/or absence of action requests detected in the procedure data container. The computer system can also derive and store a frequency of action requests detected in the set of instructional blocks and the equipment unit manual or represent a ratio of action requests to other words or phrases in the procedure data container.

8.1.2 Risk Signals

Similarly, the computer system can: scan the set of instructional blocks and the equipment unit manual in the procedure data container; and implement a risk signal model to detect words and/or phrases in the procedure data container related to threats, instability, and uncertainty associated with performance of digital procedures within the particular facility. For example, the computer system can detect words or phrases in the set of instructional blocks and the equipment unit manual, such as: "combustible materials"; "warning: do not inhale"; and/or "contents may be hot".

Accordingly, the computer system can generate a risk signal that represents the types and/or frequency of such risk-related words or phrases in the procedure data container associated with the particular equipment unit. For example, for each word or phrase detected in the procedure data container, the computer system can: normalize the word or phrase; and generate a first risk signal containing the normalized language value. In this example, the computer system can: normalize "flammable materials", "incendiary hazard", "combustible elements" to "fire risk"; and store the normalized values in discrete action signals for the procedure data container.

In another example, the computer system generates one risk signal representing presence and/or absence of risk-related words or phrases detected in the procedure data container. The computer system can also derive and store a frequency of risk-related words or phrases detected in the set of instructional blocks and the equipment unit manual or represent a ratio of risk-related words or phrases to other words or phrases in the procedure data container.

In some procedures the health and safety warnings are included at the front of the procedure in order to inform the operator what types of training and safety equipment, personal protective equipment (PPE), is required for the execution of the procedure. The computer system and the auto-generated procedures may include the types of PPE required to execute the procedure at the start of the procedure execution and may inform the operator about safety risks for each step requiring a reminder about what are the risks or what to look out for while executing each individual step or groups of steps within a section of steps to execute.

8.2 Model Generation+Procedure Convention

Generally, the computer system can: compile procedure signal containers-representing language concepts contained in the equipment unit manual and the set of instructional blocks-into a sender model that represents combinations of language concepts representative of a procedure convention for implementing the particular equipment unit during performance of steps of digital procedures within the facility. More specifically, the computer system can: scan the procedure data container-including the equipment unit manual and the set of instructional blocks—for a set of language signals (e.g., input signals, action signals, equipment unit signals, risk signals); detect combinations of language signals in the procedure data container; and train a procedure authoring model associated with the particular equipment unit to generate new sequences of instructional blocks based on: combinations of language signals in the equipment unit manual and the set of instructional blocks; and existing digital procedures currently performed within the facility. In particular, the procedure authoring model for the particular equipment unit is characterized by a procedure convention for implementing the new instructional blocks of the digital procedure within the facility by an operator performing the digital procedure with the particular equipment unit.

In one implementation, the computer system can: scan instructional blocks, an equipment unit manual, and procedure records contained in the procedure data container associated with the particular equipment unit; implement methods and techniques as described above to detect a set of language signals in the procedure data container; and define the procedure convention for the particular equipment unit based on a frequency of language signals, in the set of language signals, detected across the procedure data container. In one example, the computer system can: retrieve a first digital procedure including a first set of instructional blocks associated with the particular equipment unit in the facility; scan the first set of instructional blocks to detect a set of language signals; and calculate correlations between the set of language signals extracted from the first set of instructional blocks and the frequency of language signals defined in the procedure convention for the particular equipment unit. Thus, the computer system can, in response to a correlation exceeding a threshold correlation, interpret the first digital procedure as non-conforming to the procedure convention defined for the particular equipment unit (i.e., the first digital procedure deviates from common or typical procedures performed using the particular equipment unit within the facility).

8.2.1 Model Generation: Neural Network

In one implementation, the computer system implements artificial intelligence, machine learning, regression, and/or other techniques to train a neural network to generate a sequence of instructional blocks associated with a particular equipment unit within the facility to accomplish a target outcome (e.g., calibration, batch yield).

In this implementation, the computer system can access a procedure data container for a particular equipment unit, such as containing: a first set of data corresponding to words or phrases extracted from an equipment unit manual specifying instruction and/or regulations for operation of the particular equipment unit; a second set of data corresponding to words or phrases extracted from a set of instructional blocks, retrieved from the instructional block library, associated with the particular equipment unit; and a third set of data corresponding to words or phrases extracted from a set of procedure records, retrieved from the record library, representing previously performed instances of digital procedures that implemented the particular equipment unit. The computer system can then implement methods and techniques described above to: detect a set of language signals from these sets of data; initialize a first procedure container associated with the particular equipment unit; and store the set of language signals in the first procedure container.

The computer system can thus: repeat this process for a corpus of equipment units located within the facility; and train the procedure authoring model to identify similarities and differences between integration of equipment units across the corpus of equipment units within the facility. The computer system can also: repeat this process for a corpus of equipment units across a corpus of facilities; and train the procedure authoring model to identify similarities and differences between integration of equipment units across the corpus of facilities.

Additionally, or alternatively, the computer system can: access a set of unapproved (or "failed") procedure records from the procedure record library associated with the particular equipment unit and representing unapproved instances of digital procedures involving the particular equipment unit performed within the facility; detect a set of language signals in this set of unapproved procedure records; initialize a second digital procedure container associated with the particular equipment unit; and store the set of language signals in the second digital procedure container.

Within the set of unapproved or "failed" procedure records the reviewer may tag certain information as false or inaccurate. This data can be provided and reviewed by the neural network model as statements not to include in a procedure or groups of procedures dealing with specific equipment, methods, or facilities. This serves as a negative prompt or negative tag to exclude the statement if it has previously been flagged as false and not to include it in future generated sequences.

The computer system can then train a neural network (e.g., a convolutional neural network) to generate sequences of instructional blocks associated with the particular equipment unit based on differences and similarities between 1) the set of instructional blocks related to the particular equipment unit and approved digital procedures performed within the facility and 2) the set of instructional blocks related to the particular equipment unit and baseline (or "unapproved") digital procedures within the facility. For example, the computer system can configure the neural network to output blocks of text representing a step-by-step process for performing the generated sequence of instructional blocks by an operator with the particular equipment unit. The computer system can then store this neural network as the procedure authoring model for the particular equipment unit within the facility.

8.2.2 Model Generation: Deep Learning

In another implementation, the computer system implements deep learning techniques (e.g., transformer networks) to train a neural network to generate new sequences of instructional blocks corresponding to a particular equipment unit available for implementation within the facility.

9. Procedure Authoring

Blocks of the method S100 recite: accessing a first procedure authoring request from an operator device associated with the particular facility in Block S150; scanning the first procedure authoring request for the first set of language signals in Block S160; correlating a first sequence of words, in the first procedure authoring request, with a first equipment unit signal in the first set of language signals corresponding to the first equipment unit in Block S162; and, based on the first equipment unit signal and the first procedure authoring model, generating a first sequence of instructional blocks predicted to yield a first outcome (e.g., batch yield) of the first procedure authoring request within the particular facility in Block S170.

Generally, the computer system can: receive a prompt to generate a sequence of instructional blocks (e.g., for calibrating the equipment unit, output a target batch yield, measuring an article) such as, at an operator device associated with an operator proximal the particular equipment unit within the facility; scan the prompt to detect the set of language signals associated with the particular equipment unit; and generate a current sequence of instructional blocks based on the set of language signals detected in the prompt and the procedure authoring model associated with the particular equipment unit. In particular the computer system can: initialize a prompt at an operator device associated with an operator located proximal the particular equipment unit within the facility; populate the prompt with words or phrases input by the operator at the operator device; scan the words or phrases in the prompt to detect the set of language signals; and input the set of language signals detected in the procedure authoring model to generate a current sequence of the instructional blocks. The computer system can then: compile the sequence of instructional blocks into a visual media, such as a flowchart diagram, and/or blocks of text; and output the visual media at a display integrated into the operator device associated with the operator.

In one implementation, the computer system can: receive modifications and/or edits to the prompt, such as input by the operator at the operator device; and input the modified prompt into the procedure authoring model to generate a second sequence of instructional blocks associated with the particular equipment unit.

In another implementation, the computer system can: input the prompt into the procedure authoring model to generate a modifiable sequence of instructional blocks associated with the particular equipment unit; and output the modifiable sequence of instructional blocks at the operator device. In this implementation, the operator device can: receive manual authoring of the generated sequence of instructional blocks from the operator; and transmit the modified sequence of instructional blocks, such as to the instructional block library and/or to a remote viewer for inspection and/or review.

9.1 Ad-Hoc Procedure Authoring

In one implementation, the computer system can: access a set of wireless signals received from an operator device associated with an operator within the facility; localize the operator device at a first location within the facility based on the set of wireless signals and a facility map; detect a particular equipment unit proximal the first location within the facility, such as based on visual features extracted from optical sensors proximal the first location and/or manual confirmation of presence of the particular equipment unit by the operator at the operator device. The computer system can then retrieve a particular procedure authoring model, from a set of procedure authoring models, associated with the particular equipment unit detected proximal the first location in the facility. Thus, the computer system can, in response to detecting the particular equipment unit proximal the first location: initialize a prompt for the operator to input a string of text representing the procedure authoring request; and serve the prompt to the operator device.

The operator device can then: populate the prompt with a string of text received from the operator handling the operator device, such as "Does this equipment unit need to be calibrated?", "Please provide instructions to use this equipment unit", or "what are the inputs for this equipment unit"; generate the procedure authoring request based on the string of text received at the operator device; and transmit the procedure authoring request to the computer system for input into the procedure authoring model associated with the particular equipment unit. The computer system can then: scan the procedure authoring request to detect a first action signal (e.g., calibrate, measure, mix), in the set of language signals; and input the first action signal into the procedure authoring model to generate a sequence of instructional blocks predicted to yield a desired outcome for the action-related request identified in the procedure authoring request.

In one example, the operator can transmit a procedure authoring request corresponding to "provide instructions for calibrating this centrifuge machine" to the computer system. The computer system can thus: detect "calibrate" as an action signal in the procedure authoring request; input the "calibrate" action signal into a procedure authoring model for the centrifuge machine; and generate a sequence of instructional blocks for calibrating the centrifuge machine according to a procedure convention defined in the procedure authoring model. In this example, the computer system can then: transmit the generated sequence of instructional blocks to the operator device; and transmit images, video, and/or sections of the equipment unit manual associated with the "calibrate" action signal to the operator device. As described above, the operator device can: transmit secondary procedure authoring requests to the computer system following generation of the sequence of instructional blocks; and/or modify a previous procedure authoring request sent to the computer system to generate a new sequence of instructional blocks until a desired outcome is achieved by the operator.

Therefore, the computer system can: in real-time receive a procedure authoring request from an operator device proximal a particular equipment unit within the facility; and autonomously generate a sequence of instructional blocks to achieve an outcome of the procedure authoring request when performed by the operator within the facility.

9.2 Planned Procedure Authoring

In one implementation, the computer system can: access a facility schedule specifying time periods (e.g., a week, month) for performing steps of digital procedures related to a set of equipment units within the facility; and identify a particular equipment unit scheduled for maintenance in the facility schedule. The computer system can then: identify a second equipment unit, in a corpus of equipment units, within the facility similar to the particular equipment unit scheduled for maintenance; retrieve a procedure authoring model associated with this second equipment unit; and generate a sequence of instructional blocks, as described above, based on the procedure authoring model to replace the particular unit scheduled for maintenance within the facility with the second equipment unit. Thus, the computer system can stage digital procedures scheduled for performance within the facility to cycle (or "replace") existing equipment units utilized for performing digital procedures within the facility.

9.3 Procedure Authoring Across Corpus of Facilities

In one implementation, the computer system can: identify an equipment unit type located across a corpus of facilities; and implement methods and techniques as described above to generate a procedure authoring model associated with the equipment unit type and characteristic of a procedure convention for implementing the equipment unit type across the corpus of facilities. Thus, the computer system can: receive a procedure authoring request associated with a particular unit type across a corpus of facilities; and generate a sequence of instructional blocks for the particular equipment unit type for implementation across the corpus of facilities. The corpus of facilities may consist of a connected manufacturing network, where the computer system links the facility to other facilities globally which may be internal or external to the organization, such as in the case of utilizing an external Contract Manufacturing Organization (CMO) or Contract Development Manufacturing Organization (CDMO) in the process of manufacturing products for the original company or facility within the manufacturing network.

9.4 Procedure Authoring Model Re-Training

In one implementation, the computer system can: generate a prompt requesting a user to score an outcome of the sequence of instructional blocks following performance by the operator within the facility; and transmit this prompt to the operator device associated with the operator. In response to the operator selecting a score above a threshold score, the computer system can then append the sequence of instructional blocks to the set of instructional blocks within the procedure data container for training the procedure authoring model associated with the particular equipment unit. The computer system can thus repeat this process across sets of instructional blocks generated by the procedure authoring model to routinely train the procedure authoring model associated with the particular equipment unit.

10. Generating Guidance

Generally, the computer system can: as described above, correlate data in the procedure data container associated with the particular equipment unit with a set of risk language signals; link media (e.g., images, strings of text, video) in the procedure data container linked to the set of language signals; and autonomously generate media (e.g., audio, video, images, augmented reality) based on the set of risk language signals aggregated from the procedure data container to mitigate exposure of risk to an operator performing procedures at the particular equipment unit. In particular, the computer system can: receive a guidance media request from an operator, such as by accessing a string of text from an operator device input by an operator performing steps of a procedure at the particular equipment unit; generate "ad-hoc" media to mitigate exposure to risk to the operator based on risk language signals detected in the guidance media request and the set of data in the procedure data container linked to these risk language signals; and transmit the media to the operator, such as by displaying text, images, video at the operator device (e.g., headset, tablet, autonomous cart) and/or broadcasting audio at the operator device.

Additionally and/or alternatively, the computer system can: correlate sets of data extracted from a procedure data container associated with a particular equipment unit to a set of risk language signals; and, in response to a risk correlation exceeding a threshold correlation, generate guidance media (e.g., text, images, video, augmented reality, audio) based on the set of risk language signals in the procedure data container.

Thus, the computer system can then: generate a new digital procedure for the particular equipment unit based on the procedure authoring request accessed from the operator device; retrieve the guidance media corresponding to the set of risk language signals associated with the particular equipment unit; and transmit the new digital procedure and the guidance media to the operator device to support the operator during performance of the new digital procedure at the particular equipment unit.

To manage existing content and differentiate it from newly generated AI content there needs to be a method for adding meta-data to the instructional blocks as a layer to differentiate between existing digital guidance content, raw captured digital guidance content, recorded videos and captured images that will serve as digital guidance content, digital guidance content that was augmented, such as with augmented images, data, audio, AI generated avatars, or other content types that were overlayed on a recorded or live stream video feed and digital guidance content that was completely AI generated. This is important to distinguish between content that was created by a human operator and the content that was created utilizing generative AI from a computing system. This difference is critical to be able to easily and readily distinguish to ensure that the content created by utilizing generative AI is not utilized to hide, obscure, or falsify media content and/or content supporting documentation that goes into the batch approval processes or regulatory review without the clear indication of where the content originated from.

One method to be able to perform this is for the computer system to create an instructional block for each set of content generated in the system or by the system. The instructional blocks from this content may contain a content audit trail layer that contains the meta-data signifying how the content was created, where it originated from, and how it was changed, altered, or augmented. The instructional block audit trail layer can contain if the content was captured by the computer system from an actual event that occurred in reality, if the original content was augmented in any way, if the content was created utilizing an AI generation program by the computer system to create the content, if the content was created by the computer system in a virtual reality environment or simulation (for training purposes), if the content was created by an integrated program that connected to the computer system, or if the content was uploaded and created external to the computer system with or without the meta-data and ability to verify the validity of the information.

When an original piece of content is generated in the computer system, such as a captured image, audio file, recorded video feed, 3D volumetric capture, or other captured media type of an event such as of an operator performing a process step or task for review later by the Quality team at a company or an external regulatory body, such as the United States Food and Drug Administration (FDA), the content generated creates an instructional block which automatically creates a Non-Fungible Token (NFTs), Metadata tag, Watermark, or Hashing of the content with date and time stamps to validate the authenticity of the content captured. This is utilized to verify and validate in the computer system that the content is the true, original, raw content as it was created by the computer system, which cannot be falsified or misrepresented in the computer system. The NFT, Metadata, Watermark, or Hashing for this content captured is available in the instructional block and can be accessed to compare the original captured media content with a version of the content that may have been altered or a different piece of content which may have been autogenerated by a generative AI program. The NFTs, Metadata, Watermarks, or Hashing generated can be stored in an external repository to the computer system such as in a cloud based storage system, where a company that is utilizing the computer system is not able to access the original NFT, Metadata, Watermark, or Hashing and raw content, in an on-premises (on-prem) or private cloud system, where they may have the opportunity to change the file types in the physical storage where they are kept. This allows an additional layer of protection where the NFTs, Metadata, Watermarks, or Hashing are stored externally, stored in a cloud environment with multiple potential servers globally storing the information, and access is only read-only, ensuring that the original content cannot be altered.

In a complaint and validated platform with a full audit trail, such as a 21 CFR Part 11 compliant audit trail, the uploading of a false AI generated video or a modified version of the original video to try to misrepresent itself as the original cannot be performed in the computer system. Even in the case of a legitimate use of the platform to alter a video would require an extensive audit trail of changes, required electronic signatures from senior level managers at the company, and stated justification for every change to ensure it is not being used in any attempt to falsify data in any way. The computer system can prominently display the origin of the content and verify if it has been altered in any way providing clarity to a reviewer if this is the original content, if it has been altered or augmented, access to the original raw content created via the read-only access to the NFTs, Metadata, Watermarks, or Hashing stored in an external database, access to the instructional block layer providing the audit trail of the content, including the content origin, access to the layers of augmentations that may have been applied to the original content, or confirmation that the content was created by an AI generative program for the purposes of generating digital guidance content in support of a work process.

10.1 Ad-Hoc Generated Guidance

In one implementation, the computer system can: receive a guidance request from an operator to autonomously generate new media to support the operator in mitigating exposure to risk associated with performing steps of a procedure associated with the particular equipment unit; scan the guidance request for a first set of language signals; and identify a risk signal, in the first set of language signals, for the guidance request. The computer system can then: autonomously generate guidance media (e.g., audio, video, images) to mitigate exposure to a risk event (e.g., explosion, hazardous material exposure) associated with the risk signal in the guidance request; and transmit the guidance media to the operator, such as by displaying an image at a headset device, broadcasting audio at an autonomous cart proximal the particular equipment unit within the facility, and/or displaying text at a tablet device associated with the operator.

In one example, the computer system can: as described above, receive a guidance request from an operator device associated with the operator proximal the particular equipment unit, such as "How to resolve warning #100a923 indicated at bioreactor?"; scan the guidance request for a set of language signals; and interpret a risk signal in the set of language signals (e.g., warning #100a923) in the guidance request corresponding to a hazardous material warning at the bioreactor. Thus, the computer system can then: generate a prompt for a user to select a guidance media type (e.g., audio, video, images) for the risk signal indicated in the guidance request; and transmit this prompt to the operator device associated with the operator. The operator device can then: receive selection of the guidance media type, such as from the operator interacting with the operator device; and transmit this selection to the computer system.

In this example, the computer system can then: scan the equipment unit manual for the particular equipment unit for the risk signal; scan the set of instructional blocks associated with the particular equipment unit for the risk signal; extract strings of text, images, charts, from the equipment unit manual and the set of instructional blocks associated with the hazardous material risk signal for the bioreactor; and aggregate the strings of text, images, and charts into a digital document (e.g., a pdf document); and transmit this document to the operator device associated with the operator.

Additionally and/or alternatively, the computer system can: implement a voiceover model (or "text-to-speech") to convert strings of text in the digital document into an audio file; transmit this audio file to an operator device (e.g., tablet, smart glasses, autonomous cart) proximal the particular equipment unit; and broadcast this audio file, such as via a speaker coupled to the operator device toward the operator performing steps of the digital procedure proximal the particular equipment unit. Furthermore, the computer system can: query the record library for a particular record associated with the risk event of the guidance request; extract a video feed from the particular record depicting appropriate actions to mitigate exposure to the risk event for the particular equipment unit; and transmit the video feed to the operator device associated with the operator.

In an additional example, the ad-hoc generated guidance can be initiated by the computer system based on an event. The event that occurs can be manually entered into, automatically reported via an integrated system, or automatically detected by the computer system, assigned a risk score based on the severity of the event, where the risk score exceeds a set threshold to the operator, end-user (patient), or product.

In this embodiment the operator accidentally drops a sterilizing-grade filter capsule utilized for processing a sterile pharmaceutical drug product. The filter can no longer undergo filter integrity-testing to prove the drug product has been made sterile (removal of bacteria from the product) as per regulatory requirements using the standard filter integrity testing process. The event can be manually entered into the computer system as the operator is reporting the deviation or automatically by the computer system as is visually detected the filter capsule dropped onto the floor, via object detection, and images the filter capsule in a broken state where the housing of the filter capsule is cracked and/or the vent valves on the side of the filter capsule have broken off. This type of event receives a minimal risk score for health risk to the operator (depending on the material that has been processed), but requires the proper PPE to be worn when handling the filter with any potential hazardous materials coming from the filter. The higher risk is to the batch of materials not being able to be released without the passing filter integrity test result, which has the potential to require additional costs for processing the batch, in the case of being able to re-process the batch with an additional sterilize grade filter or has the risk of potentially limiting patient supply to a critical drug product.

The computer system once the event occurred and the risk score to the operator, end-user, and product passes a specified threshold, automatically adds digital guidance onto the existing documentation for the operator to execute so they can recover from the occurrence of the event. This may include the computer system automatically linking the existing procedure being executed to an already approved procedure for performing filter integrity testing on a dropped filter capsule, linking the existing procedure at the company or within the broader connected manufacturing network (encompassing the corpus of facilities in the company's network, which may be internal or external to the organization) to a templated section in a different procedure which contains the instruction but requires the test specifications to be automatically updated for the filter capsule and process type, to add a new section to the existing procedure with a plurality of instructional blocks with the instructions for testing the dropped capsule, or to utilize generative AI to create the series of steps for the operator to follow to recover from the dropped filter capsule based on the supplier's manual, web searches, and/or from the trained procedure authoring model. After the computer system prepares the digital guidance instructions the system may reach out to a supervisor for approval prior to sending the instructions to the operator for them to execute. It may provide an emergency notification to review and sign off on the steps. In addition, the emergency notification may include a menu of options for the supervisor to select from, where the at least one supervisor to select the method for the operator to execute, where the addition of the digital guidance instructions to the procedure are coming from, and if the information is correct prior to the operator executing the steps to recover from the event. All of this is tracked in the computer system's audit trail to verify which supervisor signed-off using an electronic signature on which method, the justification for why a method was selected, the confirmation that the information was correct, and the inclusion of date and time stamps for each step.

In this example to showcase the complexity of the multiple steps in the execution process the test steps for the evaluation of the dropped filter capsule may include: the initial testing attempt, inserting the compromised filter capsule into an appropriately sized stainless steel filter housing with an adapter for the downstream connection of the filter capsule connector, flushing and pressurizing the filter with the testing fluid (if a product wet integrity test is not utilized), connecting the filter integrity tester to the new filter assembly, running the filter integrity test with the correct test type and test parameters, recording the results of the filter integrity test, and reporting the results as part of the deviation report for review by the Quality group in an organization.

Therefore, the computer system can: receive (e.g., in real time) a guidance request from an operator device associated with a particular equipment unit within the facility; generate (e.g., ad-hoc) guidance media (e.g., video, images, audio) for the operator to mitigate exposure to a risk event associated with the guidance request received from the operator; and transmit this guidance media to an operator device associated with the operator.

10.2 Planned Guidance

In one implementation, during the initial time period, the computer system can: correlate sets of data in the procedure data container-associated with a particular equipment unit within the facility—to a set of risk signals, as described above; interpret a set of risk events based on subsets of risk signals, in the set of risk signals, associated with the particular equipment unit; and autonomously generate guidance media to support an operator interfacing with the particular equipment unit in mitigating exposure to these risk events.

In this implementation, the computer system can then: receive a procedure authoring request from the operator device associated with the operator; detect an action signal in the procedure authoring request; and detect a risk signal in the procedure authoring request associated with a particular risk event. Thus, during a deployment period, the computer system can then: generate a new procedure, as described above, based on the action signal and the procedure authoring model; retrieve the guidance media associated with the risk event previously generated by the computer system; and transmit the guidance media to the operator device associated with the operator. The operator device can thus, load the new procedure and the guidance media for display at the operator device.

For example, the computer system can: interpret an incendiary risk event based on a first subset of risk signals containing "combustible", "caution: heat", and/or "flammable material"; interpret a contamination risk event based on a second subset of risk signals containing "hazardous", "do not mix", and/or "isolation"; and interpret a calibration risk event based on a third second subset of risk signals containing "update calibration", "out of specification", and/or "calibration warning". The computer system can then, during the initial time period: generate an audible alert warning the operator of the incendiary risk event based on the first subset of risk signals; generate a warning image depicting the contamination risk event based on the second subset of risk signals; and generate a set of instructional blocks for calibrating the equipment unit based on the third subset of risk signals and the procedure authoring model. The computer system can then: aggregate the audible alert, the warning image, and the set of instructional blocks for calibrating the equipment unit into a guidance media container associated with the particular equipment unit; and, in response to detecting the set of risk signals in the procedure authoring request, transmit the guidance media container to the operator device associated with the operator.

Therefore, during the deployment period, the computer system can: detect a risk signal in a procedure authoring request for a particular equipment unit received from an operator device; and retrieve guidance media-previously generated by the computer system-associated with the risk signal and the particular equipment unit; and concurrently load a new digital procedure and the guidance media at an operator device associated with the operator interfacing with the particular equipment unit.

10.3 Autonomous Guidance

As described in U.S. patent application Ser. No. 17/968, 677, the computer system can: access a live video feed from an optical sensor proximal the particular equipment unit depicting an operator performing steps of a digital procedure; extract visual features from the live video feed; and interpret a deviation between a first step in the digital procedure-currently being performed by the operator—and a target step in the digital procedure based on differences between the visual features extracted from the live video feed and target visual features defined in the target step of the digital procedure. In one implementation, in response to interpreting a deviation exceeding a threshold deviation, the computer system can then: correlate the deviation to a set of risk signals associated with the particular equipment unit within the facility; generate guidance media (e.g., video, images, audio), as described above based on the set of risk signals; and transmit, in real time, the guidance media to the operator device to support the operator in mitigating a risk event associated with the set of risk signals.

For example, the computer system can: interpret a deviation during performance of the digital procedure by the operator corresponding to dropping a hazardous material on the floor during performance of the digital procedure; and link a set of risk signals (e.g., spill, hazardous material) to the deviation from the digital procedure. Thus, as described above, the computer system can autonomously generate guidance media based on the set of risk signals, such as an audible alert for a user to step away from the spill, a visual alert notifying a user to maintain a target distance from the spill, and/or augmented reality guidance defining a boundary about the spill. Therefore, the computer system can: autonomously detect deviations between a performed procedure within the facility and a target digital procedure assigned to the operator; correlate known risk signals associated with a particular risk event to the deviation; and autonomously generate guidance media to support an operator in mitigating the risk event during performance of the procedure within the facility.

In an alternate embodiment the computer system can utilize existing content, such as video recordings of an operator or multiple operators performing the task and showing a specific technique(s) that the operator needs to perform in the auto-generated digital guidance, where the computer system forms a digital model (such as a wireframe or skeletal diagram of all body movements and positions) of the operator, or compilation of a corpus of operators, performing the task and then overlays the action with a digital avatar performing the action.

The conversion of multiple video recordings from operators performing a task into a digital avatar virtualization using generative AI can be performed by collecting data from multiple video recordings of operators performing the task which are collected and prepared for processing. This includes cleaning the data and removing any irrelevant footage. The video data undergoes annotation for object recognition, to identify key features in the scene, and the actions performed by the operator(s). This can include identifying specific motions, gestures, and tool usage. This annotated video data is then used to train the generative AI model. The model learns to recognize patterns and identify key features in the video data. Once the AI model is trained, it can be used to generate a digital avatar that accurately reflects the movements and actions of the operator. The avatar can be customized to match the operator's physical characteristics and can be viewed from multiple angles. The generated avatar is tested and refined to ensure that it accurately reflects the operator's movements and actions. Any errors or inaccuracies are identified and corrected in the AI model. The digital avatar performing the task can reviewed by a reviewer and/or supervisor prior to including as digital guidance content. The final digital avatar is deployed for use in training videos or virtual training environments. The digital avatar training can be scored or rated based on feedback for accuracy and relevance to the digital guidance content for the procedure it is associated with.

The advantages of a digital avatar instead of a live video of an operator performing the same function are to take only the best elements of the technique performed to standardize the work process, to anonymize the operator or operators that performed the task where the techniques were captured for execution of the task, to remove the potential for the digital guidance content to be removed if an operator leaves the company and submits a right-to-be-forgotten notice to comply with GDPR requirements in Europe, and to ensure the computer system provides the highest quality representation of the digital guidance across all platforms including on tablets, Augmented Reality (AR) devices, Virtual Reality (VR) devices, Mixed Reality (MR or XR) devices, holographic, or other device types.

10.4 Example: Autonomous Cart

In one example, the computer system can: generate new instructional blocks of a digital procedure based on a particular action signal detected in a procedure authoring request and a procedure authoring model for a particular equipment unit; and generate guidance media associated with operation of the particular equipment unit based on a particular risk signal detected in the procedure authoring request and the procedure authoring model. In this example, the computer system interfaces with an autonomous cart and an operator device associated with an operator to deliver the new instructional blocks and the guidance media to the user. In particular, the computer system can: transmit the new instructional blocks to a tablet device associated with the operator within the facility performing steps of a digital procedure at the particular equipment unit; and transmit the guidance media to an autonomous cart assigned to the operator and arranged proximal the particular equipment unit during performance of the steps of the digital procedure. Thus, the operator can concurrently interface with the autonomous cart and the operator device during performance of the digital procedure to: review steps of the digital procedure currently being performed by the operator; and review risk events associated with performance of the digital procedure at the particular equipment unit.

In alternate embodiments the computer system can generate new instructional blocks which summon an autonomous cart to receive a loadout of new supplies (either loaded manually by a human operator and/or by an autonomous robotic system) and autonomously deliver them to an operator within the facility as part of the execution of new tasks assigned to the operator by the computer system.

In still alternate embodiments the computer system can generate new instructional blocks based on the safety risk to the operator which summons an autonomous cart to receive a loadout of new safety supplies (either loaded manually by a human operator and/or by an autonomous robotic system), autonomously moves into position in proximity to the operator until they have completed the tasks with a high safety risk to the operator and/or in the case of an event where the computer system detects that a safety event or health emergency was detected to occur with an operator or multiple operators, where the autonomous cart can deliver emergency supplies to an operator within the facility or to a person assisting the operator as assigned by the computer system. In addition the computer system can generate new instructional blocks to summon an autonomous cart to position the cart between the operator and a risk of danger within the facility, preventing the operator from moving into a position where they could potentially be injured by a risk event, such as preventing the operator opening a door that has not had the equipment inside shut down for lockout/tagout, a chemical or biohazardous spill on the floor, a collapsed scaffolding, or other facility hazard. In higher risk scenarios where the operator(s) life is at risk the computer system can also generate instructional blocks to summon the autonomous cart to position itself to serve as a barrier to provide more time for the operator to escape from a high risk event, such as a fire, gas leak, toxic chemicals, explosion risk, or an active shooter in a facility.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically authoring digital procedures within a facility, the method comprising:

during an initial time period:

accessing a first equipment unit manual associated with a first equipment unit located within a particular facility;

accessing an instructional block library containing instructional blocks for digital procedures performed at the particular facility;

aggregating the first equipment unit manual and a set of instructional blocks, in the instructional block library, associated with the first equipment unit into a first procedure data container;

correlating sets of data, in the first procedure data container, with a first set of language signals;

aggregating the first set of language signals into a first procedure authoring model representing combinations of language signals, in the first set of language signals, characteristic of a first procedure convention for performing the set of instructional blocks by an operator at the first equipment unit; and associating the first procedure authoring model to the particular facility in a corpus of facilities; and during a first time period following the initial time period:

accessing a first procedure authoring request from an operator device associated with the particular facility;

scanning the first procedure authoring request for the first set of language signals;

correlating a first sequence of text, in the first procedure authoring request, with a first action signal in the first set of language signals corresponding to the first equipment unit; and based on the first action signal and the first procedure authoring model, generating a first sequence of instructional blocks predicted to yield a first outcome of the first procedure authoring request within the particular facility.

\* \* \* \* \*